United States Patent
Piyush et al.

(10) Patent No.: US 9,967,339 B2
(45) Date of Patent: *May 8, 2018

(54) MIGRATING SHARED CONTENT ITEMS BETWEEN ACCOUNTS

(71) Applicant: Dropbox, Inc., San Francisco, CA (US)

(72) Inventors: Pranav Piyush, San Francisco, CA (US); Matthew Eccleston, San Francisco, CA (US); Emil Ibrishimov, Redwood City, CA (US)

(73) Assignee: Dropbox, Inc., San Francisco, CA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/638,375

(22) Filed: Jun. 30, 2017

(65) Prior Publication Data
US 2017/0302737 A1 Oct. 19, 2017

Related U.S. Application Data

(63) Continuation of application No. 14/548,166, filed on Nov. 19, 2014, now Pat. No. 9,716,753.
(Continued)

(51) Int. Cl.
*H04L 29/08* (2006.01)
*G06F 21/62* (2013.01)

(52) U.S. Cl.
CPC ...... *H04L 67/1095* (2013.01); *G06F 21/6245* (2013.01); *H04L 67/02* (2013.01)

(58) Field of Classification Search
CPC . H04L 67/1095; H04L 67/02; G06F 21/6245; G06F 17/30174; G06F 17/30581; G06F 17/30575
See application file for complete search history.

(56) References Cited

U.S. PATENT DOCUMENTS

| 8,825,597 B1 | 9/2014 | Houston et al. |
| 2013/0226876 A1* | 8/2013 | Gati ................ G06F 17/30079 707/652 |

(Continued)

OTHER PUBLICATIONS

United States Office Action, U.S. Appl. No. 14/548,166, dated Nov. 30, 2016, 24 pages.
(Continued)

*Primary Examiner* — Noura Zoubair
(74) *Attorney, Agent, or Firm* — Fenwick & West LLP

(57) ABSTRACT

Shared content items are migrated between accounts on a content management system. Users store content items synchronized between one or more client devices and the content management system. A user may have multiple accounts including personal and organization accounts. Content items may be shared with accounts belonging to other users to enable those other users to view or manipulate the content items. A user initiates a migration of content items between accounts of different categories via a user interface, e.g., by dragging and dropping a folder from one account to another. The content management system recognizes that the user has deleted the folder from the user's first account and determines that an identical folder has been created in another account belonging to the same user. In response the content management system joins the second account to the shared folder, and removes the first account from the shared folder.

20 Claims, 5 Drawing Sheets

Related U.S. Application Data

(60) Provisional application No. 61/977,463, filed on Apr. 9, 2014.

(56) References Cited

U.S. PATENT DOCUMENTS

| | | |
|---|---|---|
| 2013/0268999 A1 | 10/2013 | Kiang et al. |
| 2014/0201138 A1 | 7/2014 | Dorman et al. |
| 2014/0282938 A1* | 9/2014 | Moisa ................ G06F 21/6218 726/6 |

OTHER PUBLICATIONS

United States Office Action, U.S. Appl. No. 14/548,166, dated Jul. 28, 2016, 26 pages.
United States Office Action, U.S. Appl. No. 14/548,166, dated Mar. 25, 2016, 23 pages.

* cited by examiner

| Account Identifier | Content Path | URL Flag | URL Active Flag | Content Pointer |
|---|---|---|---|---|
| 1 | /photos/file1 | 0 | 0 | 0001 |
| 2 | /docs/file | 1 | 1 | 0002 |
| 1 | /photos/file2 | 1 | 0 | 0003 |

205 ⟶ (row 1), 210 ⟶ (row 2), 215 ⟶ (row 3)

FIG. 2

MIGRATING SHARED CONTENT ITEMS BETWEEN ACCOUNTS

CROSS-REFERENCE TO RELATED APPLICATIONS

This application is a continuation of U.S. application Ser. No. 14/548,166, filed Nov. 19, 2014, now U.S. Pat. No. 9,716,753, which application claims the benefit of U.S. Provisional Application No. 61/977,463, filed on Apr. 9, 2014, all of which are incorporated by reference in their entirety.

BACKGROUND

Field

Described embodiments relate to migrating content items across storage accounts, and more specifically pertain to migrating shared content items between multiple storage accounts belonging to a user.

Description of Related Art

Online storage accounts enable users to maintain content items in a safe and secure location and to access the content items at any time from any computing device. Additionally, users can share content items with friends, coworkers and family, through shared online storage accounts or by using generated links to content items stored in the online storage account. While sharing content is easy, migrating content to a different online storage account can be time consuming and cumbersome. Users are required to download the content items stored in the online storage to a local storage, delete the content items from the online storage and upload the content items to the new online storage account. Furthermore, if the accounts are of a different type, e.g., one account for personal use and one for business use, file or folder access permissions may be subject to different sharing and access rules.

SUMMARY

Described embodiments enable the migration of shared content items between accounts on a content management system. Users store content items on client devices, and the content items are synchronized with instances on other clients and with a content management system. A user may have multiple accounts on the content management system, and the accounts may belong to different categories, such as personal and organization account categories. Content items may be shared with accounts belonging to other users to enable those other users to view or manipulate the content items. At various times, a user may desire to migrate some content items from an account of one category to an account of another category while maintaining existing sharing relationships with other accounts.

A user initiates a migration of content items via a user interface. For example, the shared content items might include a shared folder and its contents, and the user initiates the migration by dragging and dropping the folder in a user interface from his first account into his second account.

Software on the client device interacts with a synchronization module of the content management system to facilitate the synchronization of content items across different client devices and with the content management system itself. As a result of the user initiating the migration, the content management system recognizes that the user has deleted the folder (as part of the move operation) from the initial folder associated with the user's first account. The content management system also determines that a new, identical folder has been created in another account belonging to the same identity (i.e. the same user). In one embodiment, each shared folder or shared content item includes metadata, such as a hidden file in the case of a folder, that uniquely identifies the content item to the content management system, allowing the content management system to recognize that the folder added to the second account is identical to the folder removed from the first account of the same user.

In response to detecting the deletion and addition of the folder across accounts—and provided no access policies prevent it—the content management system facilitates the migration by joining the second account to the shared folder, and removing the first account from the shared folder. Consequently, the account to which the user has migrated the file is now able to interact with the file within that account, and the other user accounts with which the folder has been shared remain part of the share. The account away from which the user migrated the folder no longer has access to the file, as that account is no longer part of the share.

BRIEF DESCRIPTION OF THE DRAWINGS

FIG. 2 shows an exemplary content directory in accordance with one embodiment.

DETAILED DESCRIPTION

Described embodiments enable the migration of shared content from a user's first online storage account to the user's second online storage account. This can be useful when personal content items and shared content items have been comingled in a single online storage account. For example, an employee may store personal content items along with work related content items in an online storage account provided by his employer. The employee may wish to move the personal content items to the employee's personal account because a work administrator has access to the online storage account and thus, the employee's personal content items.

Figure 1:
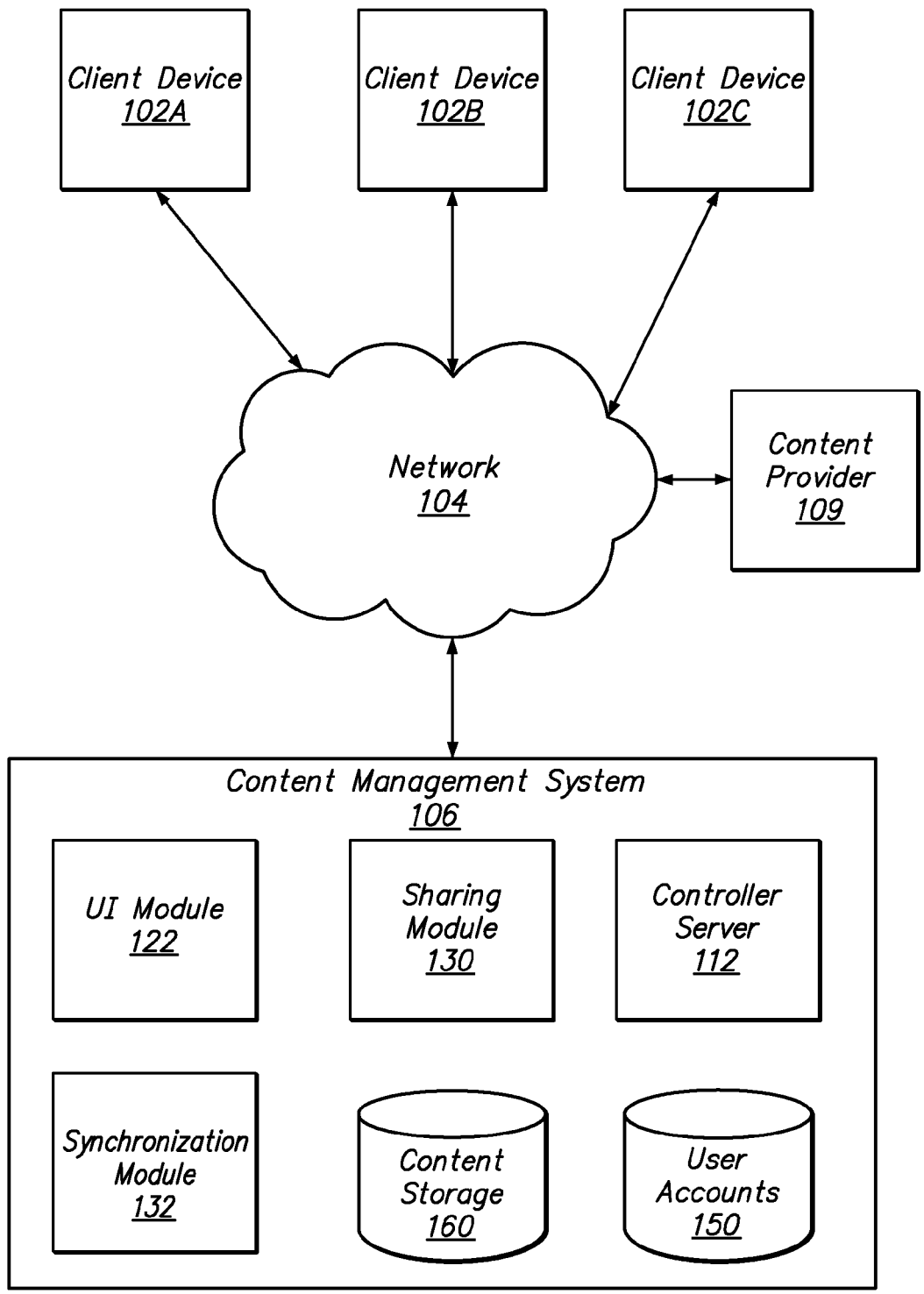
FIG. 1 shows an exemplary configuration of devices and a network in accordance with one embodiment.

FIG. 1 illustrates an example of a system 100 according to one embodiment. System 100 can be configured for use on a LAN or wide area network such as the Internet. Many configurations are suitable implementations of the described embodiments—for example, each of the components of system 100 in FIG. 1 can be implemented in a localized or distributed fashion in a network, as will be apparent to those of skill in the art.

Users interact with content management system 106 through client devices 102A, 102B, ..., 102C (generally "102") connected to network 104. Content management system 106 can support connections from a variety of different client devices, such as desktop computers; mobile computers; mobile communications devices such as mobile phones, smart phones, and tablets; smart televisions; set-top boxes; and other network enabled computing devices. Client devices 102 can be of varying type, capabilities, operating systems, etc. Furthermore, content management system 106 can concurrently accept connections from and interact with multiple client devices 102.

A user can interact with content management system 106 via a client-side application installed on client device 102. In some embodiments, the client-side application includes a content management system specific component. For example, the component can be a stand-alone application, one or more application plug-ins, or a browser extension. However, the user can also interact with content management system 106 via a third-party application, such as a web browser, that resides on client device 102 and is configured to communicate with content management system 106. In either case, the client-side application can present a user interface (UI) for the user to interact with content management system 106. For example, the user can interact with the content management system 106 via a client-side application integrated with the file system or via a webpage displayed using a web browser application.

Content management system 106 enables a user to store content, as well as perform a variety of content management tasks, such as retrieve, modify, browse, and share the content. Furthermore, content management system 106 allows a user to access the content from multiple client devices 102. For example, client device 102A can upload content to content management system 106 via network 104. The content can later be retrieved from content management system 106 using the same client device 102A or a different client device 102B.

To facilitate the various content management services, a user can create one or more accounts with content management system 106. The account information for each account is maintained in user account database 150. As further described below, accounts may be of different categories, such as an individual account or an organization account. User account database 150 in some embodiments associates each user account with an identity. In such embodiments, an identity is associated with a single individual or entity (e.g., a person, a business or other organization, etc.), and multiple accounts belonging to the same individual or entity are associated with one another in user account database 150. User account database 150 also stores profile information for registered users in various embodiments. In some cases, the only personal information in the user profile is a username or email address. However, content management system 106 can also be configured to accept additional user information.

User account database 150 can also include account management information, such as account type, e.g. free or paid; category, e.g., personal or organization account; usage information, e.g. file edit history; maximum storage space authorized; storage space used; content storage locations; security settings; personal configuration settings; content sharing data; etc.

An account can be used to store content, such as documents, text files, audio files, video files, etc., from one or more client devices 102 authorized on the account. The content can also include folders of various types with different behaviors, or other mechanisms of grouping content items together. For example, an account can include a public folder that is accessible to any user. The public folder can be assigned a web-accessible address. A link to the web-accessible address can be used to access the contents of the public folder. In another example, an account can include a photos folder that is intended for photos and that provides specific attributes and actions tailored for photos; an audio folder that provides the ability to play back audio files and perform other audio related actions; or other special purpose folders. An account can also include shared folders or group folders that are linked with and available to multiple user accounts. The permissions for multiple users may be different for a shared folder, as further described below.

Accounts may be associated with different category types in various embodiments. For example, an account may be categorized as a personal account or as an organization account. While a personal account may be entirely configurable by the user associated with the account, an organization account may be subject to security restrictions imposed by an account administrator. For example, a company may establish a set of organization accounts for its employees. The company administrator may specify as part of the account setup process that the employee account holders may not remove files from folders within the account, and may impose additional restrictions on whether files or folders may be shared and with whom they may be shared inside and outside of the organization.

Content is stored in content storage 160. Content storage 160 can be a storage device, multiple storage devices, or a server. Alternatively, content storage 160 can be a cloud storage provider or network storage accessible via one or more communications networks. Content management system 106 can hide the complexity and details from client devices 102 so that client devices 102 do not need to know exactly where the content items are being stored by content management system 106. In one embodiment, content management system 106 stores the content items in the same folder hierarchy as they appear on client device 102. However, content management system 106 can store the content items in its own order, arrangement, or hierarchy. Content management system 106 can store the content items in a network accessible storage (SAN) device, in a redundant array of inexpensive disks (RAID), etc. Content storage 160 can store content items using one or more partition types, such as FAT, FAT32, NTFS, EXT2, EXT3, EXT4, ReiserFS, BTRFS, and so forth.

Content storage 160 can also store metadata describing content items, content item types, and the relationship of content items to various accounts, folders, or groups. The metadata for a content item can be stored as part of the content item or can be stored separately. In one variation, each content item stored in content storage 160 can be assigned a system-wide unique identifier.

Content storage 160 can decrease the amount of storage space required by identifying duplicate files or duplicate chunks of files. Instead of storing multiple copies, content storage 160 can store a single copy and then use a pointer or other mechanism to link the duplicates to the single copy. Similarly, content storage 160 can store files more efficiently, as well as provide the ability to undo operations, by using a file version control that tracks changes to files, different versions of files (including diverging version trees), and a change history. The change history can include a set of changes that, when applied to the original file version, produce the changed file version.

Content management system 106 can be configured to support automatic synchronization of content from one or more client devices 102. The synchronization can be platform agnostic. That is, the content can be synchronized across multiple client devices 102 of varying type, capabilities, operating systems, etc. For example, client device 102i can include client software, which synchronizes, via a synchronization module 132 at content management system 106, content in client device 102's file system with the content in an associated user account. In some cases, the client software can synchronize any changes to content in a designated folder and its sub-folders, such as new, deleted, modified, copied, or moved files or folders. The client software can be a separate software application, can integrate with an existing content management application in the operating system, or some combination thereof. In one example of client software that integrates with an existing content management application, a user can manipulate content directly in a local folder, while a background process monitors the local folder for changes and synchronizes those changes to content management system 106. Similarly, the background process can identify content that has been updated at content management system 106 and synchronize those changes to the local folder. The client software can provide notifications of synchronization operations, and can provide indications of content statuses directly within the content management application. Sometimes client device 102 may not have a network connection available. In this scenario, the client software can monitor the linked folder for file changes and queue those changes for later synchronization to content management system 106 when a network connection is available. Similarly, a user can manually stop or pause synchronization with content management system 106.

In some embodiments, content management system 106 performs namespace mapping functions, allowing users of system 100 to interact seamlessly with shared folders through their operating system's standard user interface. For example, a first user account may have a folder called "Foo" that is synchronized with content management system 106. In one embodiment, the synchronized folder exists in a first name space, which for purposes of example we will refer to as "1:". Assume now that the user indicates that he wishes to share the "Foo" folder. In one embodiment, a user can indicate this through a user interface command, such as by right-clicking on the folder name and selecting a "Share This Folder . . . " option. Alternatively, the user can use a web interface to communicate the share instructions to content management system 106. In either event, the user also specifies the account identifier of the user(s) with whom the folder is to be shared.

Content management system 106 moves the subfolder "Foo" from the path "1:/Foo" to a new namespace, which we will call "2:", and then creates a mapping from the namespace "1:/Foo" to the namespace "2:", and instructs the client to do the same. Note that from the point of view of the user, nothing appears to have changed in the user interface.

Assume now that the invited user account has an existing namespace, "3:". Assuming the user accepts the invitation to share the folder, content management system 106 creates a link in the 3: namespace, such that "3:/Foo" points to namespace 2:. Content management system 106 also adds the invited user's identifier to the list of users sharing the folder, and begins providing change notifications to the invited user's account client. The invited user's account client then obtains the latest version of the synchronized file according to the methods described above.

Namespace mapping and content item synchronization are further described in U.S. Pat. No. 8,825,597, which is incorporated by reference herein in its entirety.

At some point, either the client who initiated the sharing of the synchronized folder, or any of the clients who subscribed to the shared folder may decide to end the sharing arrangement. At that time, metadata server 102 removes the namespace mappings initiated when the share with that client was created. In the example above, if the invited user decided to stop sharing the folder, then the link from "3:/Patent Applications" to namespace 2: would be removed. If the original user were to disable sharing for the folder, then any invited users would be unlinked from the folder as just described. In one embodiment, the folder remains in namespace 2: and the mapping from namespace "1:/Patent Applications" to namespace 2: remains intact. In an alternative embodiment, the folder is returned to its original location in namespace 1.

A user can also view or manipulate content via a web interface generated and served by user interface module 122. For example, the user can navigate in a web browser to a web address provided by content management system 106. Changes or updates to content in the content storage 160 made through the web interface, such as uploading a new version of a file, can be propagated back to other client devices 102 associated with the user's account. For example, multiple client devices 102, each with their own client software, can be associated with a single account and files in the account can be synchronized between each of the multiple client devices 102.

Content management system 106 can include a communications interface 120 for interfacing with various client devices 102, and can interact with other content and service providers 109 via an Application Programming Interface (API). Certain software applications can access content storage 160 via an API on behalf of a user. For example, a software package, such as an application on a smartphone or tablet computing device, can programmatically make calls directly to content management system 106, when a user provides credentials, to read, write, create, delete, share, or otherwise manipulate content. Similarly, the API can allow users to access all or part of content storage 160 through a web site.

Content management system 106 can also include an authenticator module (not shown), which verifies user credentials, security tokens, API calls, specific client devices, and so forth, to ensure only authorized clients and users can access files. Content management system 106 in various embodiments also includes an analytics module to track and report on aggregate file operations, user actions, network usage, total storage space used, as well as other technology, usage, or business metrics. A privacy and/or security policy can prevent unauthorized access to user data stored with content management system 106.

Content management system 106 includes sharing module 130 for managing sharing content publicly or privately. Sharing content publicly can include making the content item accessible from any computing device in network communication with content management system 106. Sharing content privately can include linking a content item in content storage 160 with two or more user accounts so that each user account has access to the content item. The sharing can be performed in a platform agnostic manner. That is, the content can be shared across multiple client devices 102 of varying type, capabilities, operating systems, etc. The content can also be shared across varying types and categories of user accounts.

In some embodiments, content management system 106 is configured to maintain a content directory identifying the location of each content item in content storage 160. The content directory can include a unique content entry for each content item stored in the content storage. In addition, in one embodiment each folder includes a file having a unique name assigned by content management system 106. This file may include attributes that instruct the client 102 to hide the file from view. As discussed further below, content management system 106 uses the unique filename within a folder to facilitate migration of the folder from one account to another.

A content entry can include a content path that can be used to identify the content item. For example, the content path can include the name of the content item and a folder hierarchy associated with the content item. For example, the content path can include a folder or path of folders in which the content item is placed as well as the name of the content item. Content management system 106 can use the content path to present the content items in the appropriate folder hierarchy.

A content entry can also include a content pointer that identifies the location of the content item in content storage 160. For example, the content pointer can include the exact storage address of the content item in memory. In some embodiments, the content pointer can point to multiple locations, each of which contains a portion of the content item.

In addition to a content path and content pointer, a content entry can also include a user account identifier that identifies the user account that has access to the content item. In some embodiments, multiple user account identifiers can be associated with a single content entry indicating that the content item has shared access by the multiple user accounts.

A user joins a shared content item when the content item is shared by another user. Sharing module 130 can be configured to add a user account identifier for the joining user to the content entry associated with the content item, thus granting the joining user account access to the content item. Sharing module 130 can also be configured to remove user account identifiers from a content entry to prevent a user account's access to the content item when the user leaves the content item.

To share content publicly, sharing module 130 can be configured to generate a custom network address, such as a uniform resource locator (URL), which allows any web browser to access the content in content management system 106 without any authentication. To accomplish this, sharing module 130 can be configured to include content identification data in the generated URL, which can later be used to properly identify and return the requested content item. For example, sharing module 130 can be configured to include the user account identifier and the content path in the generated URL. Upon selection of the URL, the content identification data included in the URL can be transmitted to content management system 106 which can use the received content identification data to identify the appropriate content entry and return the content item associated with the content entry.

In addition to generating the URL, sharing module 130 can also be configured to record that a URL to the content item has been created. In some embodiments, the content entry associated with a content item can include a URL flag indicating whether a URL to the content item has been created. For example, the URL flag can be a Boolean value initially set to 0 or false to indicate that a URL to the content item has not been created. Sharing module 130 can be configured to change the value of the flag to 1 or true after generating a URL to the content item.

In some embodiments, sharing module 130 can also be configured to deactivate a generated URL. For example, each content entry can also include a URL active flag indicating whether the content should be returned in response to a request from the generated URL. For example, sharing module 130 can be configured to only return a content item requested by a generated link if the URL active flag is set to 1 or true. Thus, access to a content item for which a URL has been generated can be easily restricted by changing the value of the URL active flag. This allows a user to restrict access to the shared content item without having to move the content item or delete the generated URL. Likewise, sharing module 130 can reactivate the URL by again changing the value of the URL active flag to 1 or true. A user can thus easily restore access to the content item without the need to generate a new URL.

FIG. 2 shows an exemplary content directory 200. As illustrated, there are three content entries in the content directory and each content entry includes 5 values: user account identifier, content path, content pointer, URL flag, and URL active flag. As illustrated, the first content entry 205 and third content entry 215 each have the same user account identifier '1' indicating that both content entries are associated with the same user account. The second content entry 210 is associated with a different user account identifier, '2,' and thus a different user account.

The content path includes a file name and folder hierarchy. As illustrated, the first entry 205 is associated with a content item named file1 and located in the photos folder. The second content entry 210 is associated with a content item named file and located in the docs folder and the third content entry 215 is associated with a content item named file2 and located in the photos folder.

As illustrated, the URL flag and the URL active flag of the first content entry 205 are both set to 0 or false indicating that a URL has not been created for the content item associated with the content entry. The second content entry 210, in contrast, has a value of 1 for the URL flag and URL active flag indicating that a URL has been created to the content item associated with the content entry and that the URL is active and thus the content item should be returned in response to a user selecting the URL. Finally the third content entry 215 has a value of 1 or true for the URL flag and a value of 0 for the URL active flag. Thus a URL to the content item associated with the content entry 215 has been created, however the URL has been deactivated and thus the content item should not be returned in response to selection of the URL.

The content pointer value indicates the location in storage memory of the content item associated with each content entry. As illustrated, the first content entry 205 has a content pointer of 0001, indicating that the content item associated with the content entry is located at memory location 0001. The content pointer for the second 210 and third 215 content pointers point to different locations in memory.

Migrating Shared Folders

Each of the user's accounts may include one or more shared folders. As described above, a shared folder is a folder to which other user accounts have access. Depending on the implementation and the security permissions set either by an administrator or the user who administers the shared folder, the other user accounts can add, modify or delete content within the shared folder, invite others to join the shared folder, and kick—that is, remove—users from the shared folder.

As described above, an account may include multiple content items of different types. To illustrate migration of content items from one account to another, we assume below that a user has a variety of files stored in folders within one or more accounts on content management system 106, and no loss of generality is intended.

In one embodiment, each shared folder includes a file that describes sharing information for that folder. Sharing information includes, for example, an account ID for each user account that has joined the folder, and may additionally include a set of permissions associated with each joined account. In various embodiments the file is marked as hidden to avoid inadvertent manipulation by the user. In addition to describing sharing information for the folder, the hidden file uniquely identifies the folder to content management system 106.

Content management system 106 supports accounts of different categories. In one embodiment, categories include personal accounts and organization accounts. Organization accounts enable multiple accounts affiliated with an organization or other entity to be shared within all or part of that organization and to be administered by the organization. An administrator can set policies for shared folders in the organization that allow or restrict users' abilities to add, modify or delete files within the folders, and to share the folders with additional users outside of the organization.

A single individual or entity may have multiple accounts with content management system 106, and accounts may be of different categories. For example, a user may have both a personal and an organization account with content management system 106. In various embodiments, the individual or entity has a single identity that is known to content management system 106, and a single client device 102 supports interaction by the user with each of the accounts. For example, in one embodiment a user can view and manipulate files and folders within either account via a single user interface such as a file browser on client device 102. Solely for clarity of description, we assume below that a single individual has one personal account and one organization account with content management system 106. In practice, individuals or entities may have multiple accounts belonging to each category.

At various times, a user may wish to move—or migrate—a shared folder from one of his accounts to another. For example, a user may discover that within his organization account on content management system 106, there is a folder of personal photos from a recent trip, and he is sharing the folder with his family. The shared folder more appropriately belongs in the user's personal account, and he thus would like to migrate it.

As described above, a user interacts with content management system 106 via user interface module 122, and various types of user interfaces are supported. In one example, a client integrates with an operating system on a user device; in alternative user interfaces a web browser is used to view and manipulate content. The user thus initiates a move of a shared folder from one account to another in any of a number of ways depending on the particular user interface available.

Figure 3:
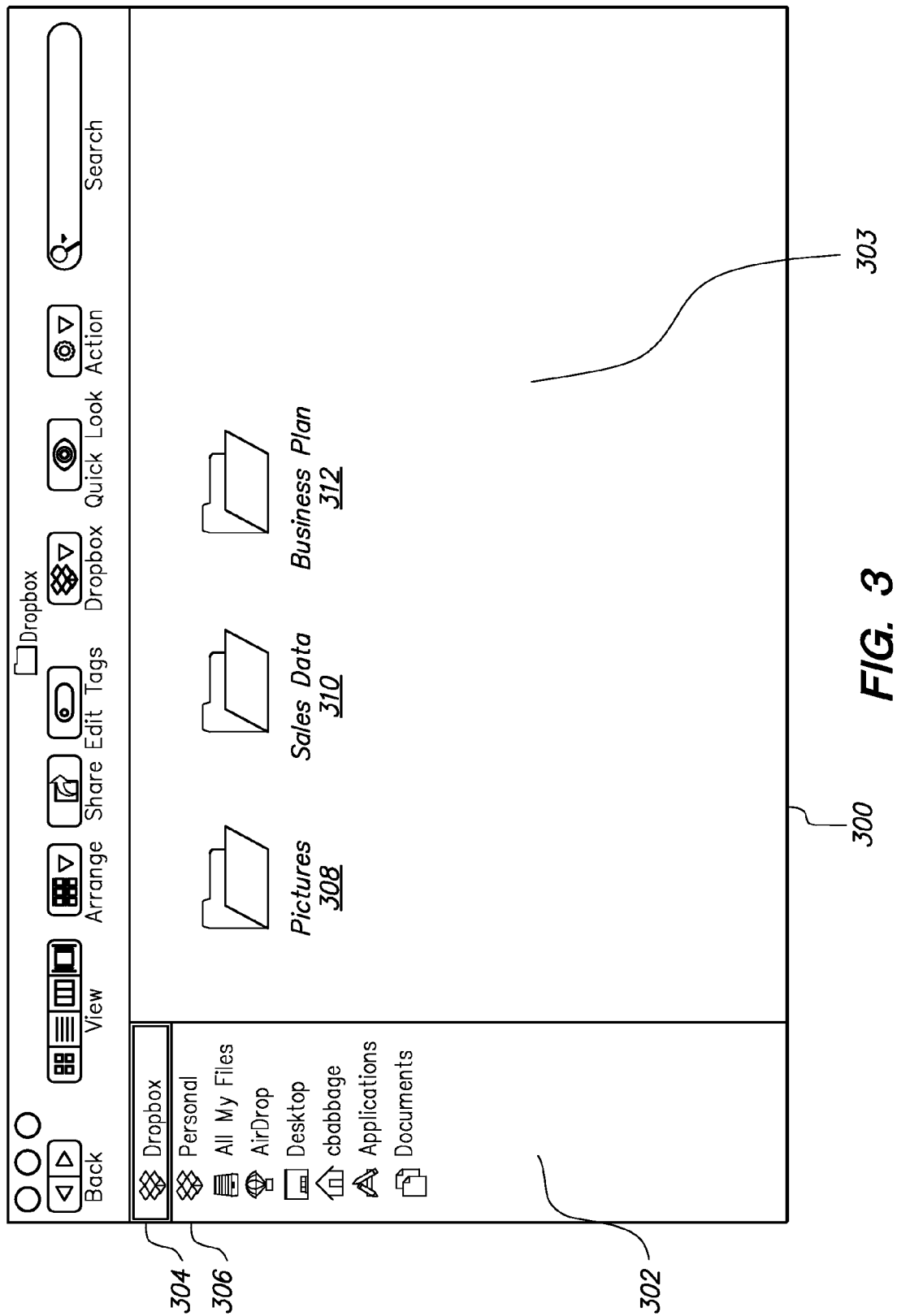
FIG. 3 illustrates an example of a user interface suitable for migration of content items in accordance with one embodiment.

For example, and referring to FIG. 3, in a windows-based operating system in which the client-side application integrates with the operating system, shared folders appear alongside other files and folders on client 102. FIG. 3 illustrates an example of a file browsing window 300 in such an embodiment. A navigation area 302 allows the user to click on a particular folder shortcut, and contents of that folder are displayed in a file display region 303 of the window 300. In the illustrated example, the user has two accounts with content management system 106: an organization account 304, named "Dropbox," and a personal account 306, named "Personal." Note that the folder names are arbitrary, and may be chosen by the user or by an account administrator at will. The user's organization account 304, "Dropbox," has been selected, and several folders are indicated in region 303, including "Pictures" 308, "Sales Data" 310, and "Business Plan" 312. We further assume that each of these folders is a shared folder subject to any policies for file and folder manipulation implemented by the business administrator as described above.

In the embodiment illustrated in FIG. 3, the user wishes to move the "Pictures" folder 308 from his organization account 304 to his personal account 306, and does so by simply selecting the folder 308, and dragging and dropping the folder into the personal account 306. In alternative embodiments, user interface module 122 enables a user to select a folder to move via a text interface, keyboard selection, or other manner appropriate for receiving input on the particular client device 102 in use.

As a consequence of the drag-and-drop action on the client device 102, the folder 308 is deleted from the container folder 304 ("Dropbox" in this case) on the client device 102, and created with the identical contents in the target folder 306 ("Personal") of the client device 102. The client application then notifies synchronization module 132 of the changes within each folder. As a consequence of the folder being deleted from containing folder 304, the hidden file within the folder was also deleted, and that event is in various embodiments logged by content management module 106 for use as described below.

Note that because folder 308 is a shared folder, in various embodiments the deletion of the folder by the user from client device 102 does not delete the folder from content management system 106 or otherwise impact the access of other user accounts that have joined the folder.

Synchronization module 132 also synchronizes the newly created folder in the target containing folder 306. As noted, the contents of the new folder are identical to that of the old folder, consistent with the drag-and-drop abstraction. Content management module 106 thus detects that the hidden file, having been just deleted from a folder in the identity's organization account, is now present in a folder in the identity's personal account. Content management system 106 interprets this movement of the hidden file from one folder in the first account to another folder in the other account belonging to the same identity as an indication that the user is migrating the folder between accounts.

In response to the determination that the user is attempting to migrate the folder from one account to another account, sharing module 130 joins the user's second account (the personal account, in this example) to the shared folder, and kicks (or removes) the user's first account (the organization account, in this example) from the shared folder.

As a consequence of joining the user's second account and removing the user's first account from the share, the folder is effectively migrated from the first account to the second without impacting other users who have also joined the shared folder—in this example, the user's family is still joined to the Pictures folder even though it has migrated to the user's personal account. Because the user's organization account has been removed from the shared folder, the folder becomes inaccessible to that user's account, unless the permissions for the folder are set to be publicly readable.

As noted, organization accounts may be subject to restrictions imposed by an administrator. In various embodiments, if the restrictions prevent the user from migrating the folder then the folder is simply copied by the operating system on client device 102 or by content management system 106 itself from the first account to the second, with no change in shared folder membership for either account. For example, if organization accounts within a particular organization are not allowed to share the folder in question with accounts outside the organization, then the migration cannot take place, as it would result in the joining of an account (the user's personal account) that is not part of the organization. In various embodiments, migration of shared folders between organization accounts and personal accounts are logged for display to administrators of the organization accounts.

Also in various embodiments, content management system 106 informs client software on client device 102 that the migration has been completed and that the shared relationships have been transferred from the first account to the second account. Similarly, if the migration fails, the client software is notified of the failure. The client software then provides the notification to the user of client device 102.

Figure 4:
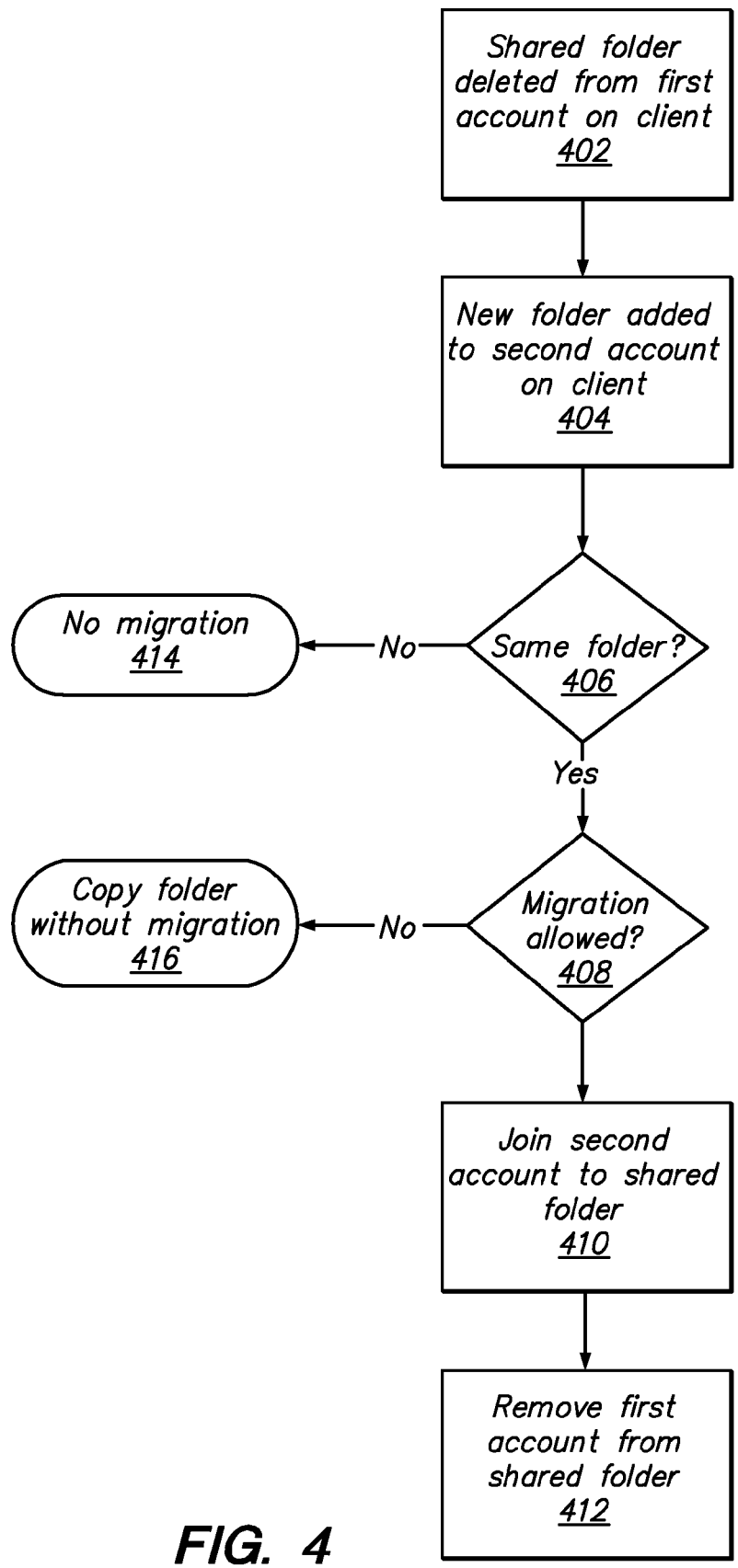
FIG. 4 illustrates a method for migrating shared content items in accordance with one embodiment.

FIG. 4 illustrates a method for migrating a shared folder as described above. Content management system detects 402 that a shared folder has been removed from a first account on a client device, and that a new folder has been added 404 to a second account on the client device that is associated with the same identity as the first account. Content management system 106 next determines 406 whether the added and deleted folders are the same, for example by identifying a file common to each folder that uniquely identifies the folder to content management system 406. If the folders are not the same, then no migration is occurring 414, and the deletion and addition of folders is not otherwise impacted. Alternatively, if 406 the folders are the same, then content management system 106 determines that the user is attempting to migrate the folder from the first account to the second account. Content management system 106 then determines whether 408 migration of that folder from the first account to the second is permitted. If not, then the folder is simply copied 416 to the second account. Alternatively, if the migration is permitted, content management system 106 proceeds to join 410 the second account to the shared folder, and remove 412 the first account from the shared folder.

Because content management system 106 synchronizes files with device 102 via a network, and because network operations involve both latency and unpredictability, it is possible that synchronization module 132 may be notified of the creation of the new folder in the user's second account before being notified of the deletion of the folder from the user's first account. Accordingly, in various embodiments content management system 106 determines that a shared folder migration is taking place when an identical folder (as indicated by the presence of the identical hidden file) is created on a client device 102 in one account of an identity and deleted on the client device 102 from another account of the identity within a threshold time, regardless of the order in which the events occur. The threshold may be selected by the implementer according to network conditions or other considerations, and in some examples may be as short as several seconds, or may be several minutes or longer.

In an alternative embodiment, when content management system 106 determines that a client device 102 has deleted its copy of a shared folder in one account, and that shared folder is also in another account belonging to the same identity, content management system 106 concludes that the account from which the folder was deleted should be kicked from the shared folder.

Figure 5A:
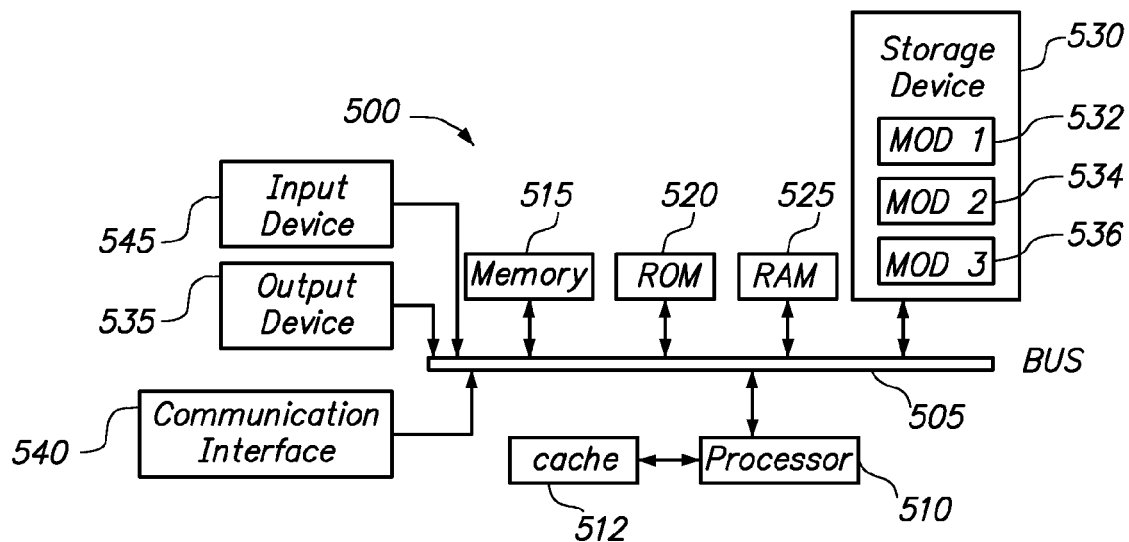
FIGS. 5A and 5B show exemplary possible system embodiments.
Figure 5B:
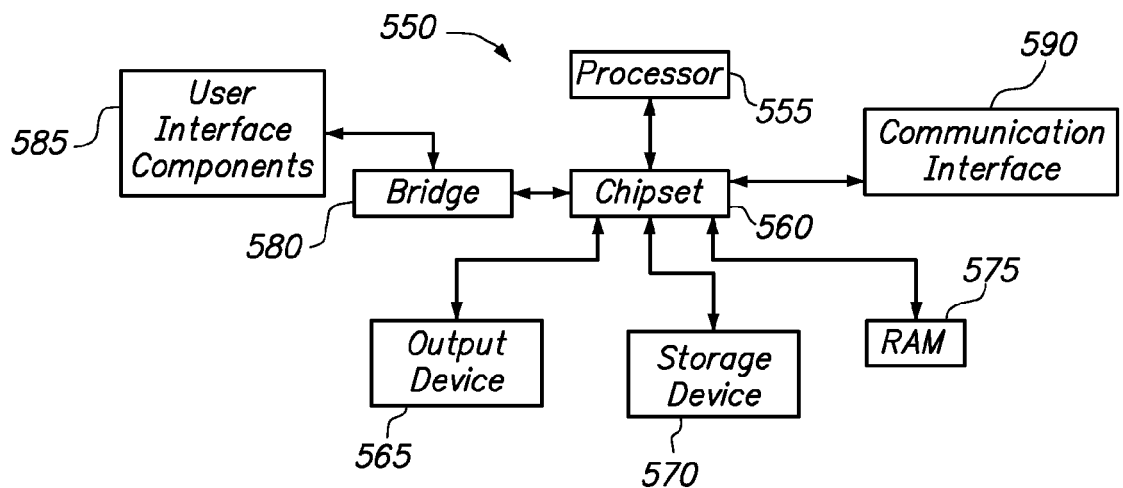

FIGS. 5A and 5B shows exemplary possible system embodiments. The more appropriate embodiment will be apparent to those of ordinary skill in the art when practicing the present technology. Persons of ordinary skill in the art will also readily appreciate that other system embodiments are possible.

FIG. 5A shows a conventional system bus computing system architecture 500 wherein the components of the system are in electrical communication with each other using a bus 505. Exemplary system 500 includes a processing unit (CPU or processor) 510 and a system bus 505 that couples various system components including the system memory 515, such as read only memory (ROM) 520 and random access memory (RAM) 525, to the processor 510. The system 500 can include a cache of high-speed memory connected directly with, in close proximity to, or integrated as part of the processor 510. The system 500 can copy data from the memory 515 and/or the storage device 530 to the cache 512 for quick access by the processor 510. In this way, the cache can provide a performance boost that avoids processor 510 delays while waiting for data. These and other modules can control or be configured to control the processor 510 to perform various actions. Other system memory 515 may be available for use as well. The memory 515 can include multiple different types of memory with different performance characteristics. The processor 510 can include any general purpose processor and a hardware module or software module, such as module 1 532, module 2 534, and module 3 536 stored in storage device 530, configured to control the processor 510 as well as a special-purpose processor where software instructions are incorporated into the actual processor design. The processor 510 may essentially be a completely self-contained computing system, containing multiple cores or processors, a bus, memory controller, cache, etc. A multi-core processor may be symmetric or asymmetric.

To enable user interaction with the computing device 500, an input device 545 can represent any number of input mechanisms, such as a microphone for speech, a touch-sensitive screen for gesture or graphical input, keyboard, mouse, motion input, speech and so forth. An output device 535 can also be one or more of a number of output mechanisms known to those of skill in the art. In some instances, multimodal systems can enable a user to provide multiple types of input to communicate with the computing device 500. The communications interface 540 can generally govern and manage the user input and system output. There is no restriction on operating on any particular hardware arrangement and therefore the basic features here may easily be substituted for improved hardware or firmware arrangements as they are developed.

Storage device 530 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 525, read only memory (ROM) 520, and hybrids thereof.

The storage device 530 can include software modules 532, 534, 536 for controlling the processor 510. Other hardware or software modules are contemplated.

The storage device 530 can be connected to the system bus 505. In one aspect, a hardware module that performs a particular function can include the software component stored in a computer-readable medium in connection with the necessary hardware components, such as the processor 510, bus 505, display 535, and so forth, to carry out the function.

FIG. 5B shows a computer system 550 having a chipset architecture that can be used in executing the described method and generating and displaying a graphical user interface (GUI). Computer system 550 is an example of computer hardware, software, and firmware that can be used to implement the disclosed technology. System 550 can include a processor 555, representative of any number of physically and/or logically distinct resources capable of executing software, firmware, and hardware configured to perform identified computations. Processor 555 can communicate with a chipset 560 that can control input to and output from processor 555. In this example, chipset 560 outputs information to output 565, such as a display, and can read and write information to storage device 570, which can include magnetic media, and solid state media, for example. Chipset 560 can also read data from and write data to RAM 575. A bridge 580 for interfacing with a variety of user interface components 585 can be provided for interfacing with chipset 860. Such user interface components 585 can include a keyboard, a microphone, touch detection and processing circuitry, a pointing device, such as a mouse, and so on. In general, inputs to system 550 can come from any of a variety of sources, machine generated and/or human generated.

Chipset 560 can also interface with one or more communication interfaces 590 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 555 analyzing data stored in storage 570 or 575. Further, the machine can receive inputs from a user via user interface components 585 and execute appropriate functions, such as browsing functions by interpreting these inputs using processor 555.

It can be appreciated that exemplary systems 500 and 550 can have more than one processor 510 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

In addition to the embodiments specifically described above, those of skill in the art will appreciate that the invention may additionally be practiced in other embodiments.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention.

We claim:

1. A method, comprising:
    storing, by a content management system comprising a hardware processor, a content item in a first account of a user of the content management system, the content item synchronized between the first account of the user and a different account of a different user;
    receiving, by the content management system from a client computing device of the user, a first notification indicating that the content item has been deleted from a first storage location on the client computing device associated with the first account of the user;
    receiving, by the content management system from the client computing device, a second notification indicating that the content item has been created in a second storage location on the client computing device associated with a second account of the user of the content management system;
    responsive to receiving the first notification and the second notification within a threshold time of each other, determining, by the content management system, that the user is requesting to migrate the content item from the first account to the second account; and
    responsive to determining that the user is requesting to migrate the content item, automatically synchronizing, by the content management system, the content item between the different account of the different user and the second account and removing access by the first account to the content item by updating synchronization information associated with the content item to indicate that the content item is synchronized with the second account and not synchronized with the first account.

2. The method of claim 1, wherein the content item is deleted from the first storage location and the content item is created in the second location responsive to the user performing a drag-and-drop action in a graphical user interface in which the content item is dragged from a first folder associated with the first account and dropped into a second folder associated with the second account.

3. The method of claim 1, wherein the content management system does not delete the content item from the content management system responsive to receiving the first notification indicating that the content item has been deleted from the first storage location.

4. The method of claim 1, wherein the content item is a folder and the synchronization information is included in a hidden file of the folder.

5. The method of claim 4, wherein determining that the user is requesting to migrate the content item comprises:
determining, based on the first notification and the second notification, that a hidden file in the folder that has been deleted from the first storage location matches a hidden file that is present in the folder that has been created in the second storage location.

6. The method of claim 1, wherein updating the synchronization information comprises:
adding information identifying the second account to the synchronization information; and
removing information corresponding to the first account from the synchronization information.

7. The method of claim 1, wherein the content item has an associated namespace, and wherein updating the synchronization information comprises creating a mapping within the synchronization information from a namespace associated with the second account to the namespace associated with the content item.

8. The method of claim 7, wherein updating the synchronization information further comprises removing a mapping within the synchronization information from a namespace associated with the first account to the namespace associated with the content item.

9. The method of claim 1, wherein updating the synchronization information comprises:
removing a namespace identifier within the synchronization information assigned to the content item from a list of namespaces accessible by the first account; and
adding the namespace identifier within the synchronization information to a list of namespaces accessible by the second account.

10. The method of claim 1, wherein prior to updating the synchronization information, the second account is unable to access the content item.

11. The method of claim 1, wherein the first account is subject to a security policy, and wherein prior to updating the synchronization information, the content management system determines whether the security policy permits synchronizing the content item with the second account.

12. The method of claim 11, wherein the first account is an organization category account, and wherein the security policy applies to each of a plurality of organization accounts associated with an organization.

13. The method of claim 1, wherein the first account is an organization category account and the second account is a personal category account, and further comprising, responsive to determining that the user is requesting to migrate the content item, creating a log entry for display to an administrator associated with the organization.

14. The method of claim 1, wherein the second account is subject to a security policy, and wherein prior to updating the synchronization information, the content management system determines whether the security policy permits synchronizing the content item with the second account.

15. The method of claim 14, wherein the first account is a personal category account not subject to the security policy, and wherein the second account is an organization category account, the security policy applying to each of a plurality of organization accounts associated with an organization.

16. A non-transitory computer-readable medium including computer-executable program instructions, the instructions when executed by one or more processors causing the one or more processors to perform steps comprising:
storing, by a content management system comprising a hardware processor, a content item in a first account of a user of the content management system, the content item synchronized between the first account of the user and a different account of a different user;
receiving, by the content management system from a client computing device of the user, a first notification indicating that the content item has been deleted from a first storage location on the client computing device associated with the first account of the user;
receiving, by the content management system from the client computing device, a second notification indicating that the content item has been created in a second storage location on the client computing device associated with a second account of the user of the content management system;
responsive to receiving the first notification and the second notification within a threshold time of each other, determining, by the content management system, that the user is requesting to migrate the content item from the first account to the second account; and
responsive to determining that the user is requesting to migrate the content item, automatically synchronizing, by the content management system, the content item between the different account of the different user and the second account and removing access by the first account to the content item by updating synchronization information associated with the content item to indicate that the content item is synchronized with the second account and not synchronized with the first account.

17. The computer-readable storage medium of claim 16, wherein the content item is a folder and the synchronization information in included in a hidden file of the folder, and wherein determining that the user is requesting to migrate the content item comprises:
determining, based on the first notification and the second notification, that a hidden file in the folder that has been deleted from the first storage location matches a hidden file that is present in the folder that has been created in the second storage location.

18. The computer-readable storage medium of claim 16, wherein the first account is an organization category account and the second account is a personal category account, and the steps further comprising, responsive to determining that the user is requesting to migrate the content item, creating a log entry of for display to an administrator associated with the organization.

19. A content management system, comprising:
one or more processors;

a non-transitory computer-readable medium including computer-executable program instructions, the instructions when executed by the one or more processors causing the one or more processors to perform steps comprising:

storing, by a content management system comprising a hardware processor, a content item in a first account of a user of the content management system, the content item synchronized between the first account of the user and a different account of a different user;

receiving, by the content management system from a client computing device of the user, a first notification indicating that the content item has been deleted from a first storage location on the client computing device associated with the first account of the user;

receiving, by the content management system from the client computing device, a second notification indicating that the content item has been created in a second storage location on the client computing device associated with a second account of the user of the content management system;

responsive to receiving the first notification and the second notification within a threshold time of each other, determining, by the content management system, that the user is requesting to migrate the content item from the first account to the second account; and responsive to determining that the user is requesting to migrate the content item, automatically synchronizing, by the content management system, the content item between the different account of the different user and the second account and removing access by the first account to the content item by updating synchronization information associated with the content item to indicate that the content item is synchronized with the second account and not synchronized with the first account.

20. The content-management system of claim 19, wherein the content item is a folder and the synchronization information is included in a hidden file of the folder, and wherein determining that the user is requesting to migrate the content item comprises:

determining, based on the first notification and the second notification, that a hidden file in the folder that has been deleted from the first storage location matches a hidden file that is present in the folder that has been created in the second storage location.

* * * * *

UNITED STATES PATENT AND TRADEMARK OFFICE
CERTIFICATE OF CORRECTION

PATENT NO.        : 9,967,339 B2                                    Page 1 of 1
APPLICATION NO.   : 15/638375
DATED             : May 8, 2018
INVENTOR(S)       : Pranav Piyush et al.

It is certified that error appears in the above-identified patent and that said Letters Patent is hereby corrected as shown below:

Column 16, Line 51, Claim 17 delete "information in included in a hidden file of the folder," and insert --information is included in a hidden file of the folder,--.

Column 16, Line 64, Claim 18 delete "log entry of for display" and insert --log entry for display--.

Signed and Sealed this
Twenty-sixth Day of June, 2018

Andrei Iancu
*Director of the United States Patent and Trademark Office*